United States Patent Office 3,394,107
Patented July 23, 1968

3,394,107
PROCESS FOR PRODUCTION OF
POLYOXYMETHYLENE
Ryoichi Wakasa, Shinichi Ishida, and Hiroshi Ohama, Tokyo, Japan, assignors to Asahi Kasei Kogyo Kabushiki Kaisha, Osaka, Japan, a corporation of Japan
No Drawing. Filed July 8, 1964, Ser. No. 381,257
Claims priority, application Japan, July 8, 1963, 38/35,146; Aug. 2, 1963, 38/40,310
11 Claims. (Cl. 260—67)

ABSTRACT OF THE DISCLOSURE

A method for producing polyoxymethylene by polymerizing trioxane. Trioxane is heated for 1–50 hours at a temperature between room temperature and 200° C. with 0.0001–1% by weight of a polymerization catalyst. The catalyst is:

(a)

wherein X is $R_1$ or $R_2O$, Y is $OR_3$ or

when X is $R_1$ and Y is $OR_5$ or halogen when X is $R_2O$. $R_1$, $R_2$, $R_3$ and $R_5$ may be the same or different and they are selected from the group consisting of alkyl groups of 1–4 carbon atoms, an aryl group of 6 carbon atoms, an aralkyl group of 7 carbon atoms, and derivatives thereof being substituted by groups including chlorine, nitrogen, oxygen, sulfur, carbon and hydrogen atoms, $R_4$ is an aryl group of 6 carbon atoms, $R_1$ and $R_4$ are equalivent when Y is

and the aryl and substituted aryl groups are excluded from $R_2$ when Y is a halogen (b)

wherein X is $R_1$, $R_1O$ or $R_1$, $R_2$, N, Y is $R_3O$ or $R_3S$; $R_1$, $R_2$ and $R_3$ each being the same or different, and being alkyl groups of 1–3 carbon atoms, an aryl group of 6 or 10 carbon atoms, an aralkyl group of 7 carbon atoms, and derivatives thereof being substituted by groups including chlorine, nitrogen, oxygen, carbon and hydrogen atoms, and when X is $R_1$, Y is $R_3O$ and $R_1$ and $R_3$ are alkyl, X and Y form a ring with the S atom; (c) salts of metals of the Ia, Ib, IIa, IIb, IIIa, IVa, Va, VIb, VIIb and VIIIb groups of the periodic table; and (d) organic amine salts of sulfurous acid, alkyl, aryl or aralkyl substituted sulfuric acids, hydrosulfuric acid, pyrosulfuric acid, alkyl, aryl or aralkyl substituted thiosulfuric acid and polythionic acid.

---

This invention relates to a process for producing a tough high molecular weight material the polymerization of trioxane by using a novel polymerization catalyst.

Trioxane is a cyclic trimer of formaldehyde having a six-membered heterocyclic ring consisting of alternating oxygen atoms and methylene groups.

It is known that trioxane may be polymerized in the presence of certain specific inorganic fluorides such as antimony trifluoride, boron trifluoride, a coordination complex compound of these compounds with water, or a coordination complex compound of these compounds with an oxygen donor or sulfur donor organic compound to produce a tough, high molecular weight polymer, known as polyacetal resin or polyoxymethylene.

It is an object of the present invention to provide a new process for producing a tough, high molecular material from trioxane which comprises polymerizing trioxane by utilizing a novel polymerization catalyst.

In the present invention, the following three groups of catalysts are used.

(1) Compounds having the general formula

wherein X represents an $R_1$—, or $R_2O$—; Y represents a —$OR_3$ or

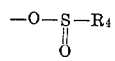

when X represents $R_1$ and is a —$OR_5$ or halogen when X represents $R_2O$, with the proviso that $R_1$, $R_2$, $R_3$ and $R_5$ each may be the same or different and represents an alkyl, aryl, aralkyl, cycloalkyl, alkenyl or above-mentioned alkyl, aryl, aralkyl, cycloalkyl or alkenyl having functional groups composed of such atoms as chlorine, nitrogen, oxygen, sulfur, carbon and hydrogen, $R_4$ represents aryl or aryl group having above-mentioned functional groups, $R_1$ is the same kind with $R_4$ when Y represents $$-\text{O}-\underset{\underset{\text{O}}{\|}}{\text{S}}-R_4$$

and aryl or aryl group having above-mentioned functional group is excluded from $R_2$ when Y represents halogen and further X and Y may form a ring.

The polymerization catalyst represented by the general formula

includes such well known compounds as esters of alkyl-, aryl-, or aralkyl-sulfinic acids, halides thereof, anhydrides of aryl sulfinic acid, alkylesters of halogenyl sulfinic acids, or esters of diaryl- or diaralkyl sulfurous acid.

As above-said compounds; methyl ester of benzene sulfinic acid, ethyl-, n-propyl-, isobutyl-, or benzyl-ester of toluene sulfinic acid, methyl-, ethyl-, n-propyl-, or benzyl-ester of p-chlorobenzene sulfinic acid, ethyl-, or benzyl-ester of m-nitrobenzene sulfinic acid, benzene sulfinic-acid, -chloride, -fluoride, or -iodide, n-butylsulfinic-acid-chloride, -fluoride, -iodide or -bromide, benzene sulfinic acid anhydride, toluene sulfinic acid anhydride, methyl-ethyl-, isopropyl-, ester of chlorosulfinic acid, methyl-, ethyl-, isopropyl-, ester of fluorosulfinic acid, methyl-, ethyl-, isopropyl-, ester of bromosulfinic acid, dimethyl sulfurous acid, diethyl sulfurous acid, di-n-propyl sulfurous acid, diisopropyl sulfurous acid, etc. are, for example, included.

(2) Compounds having the general formula

wherein X represents an $R_1$—, $R_1O$—, $R_1NH$—, or $R_1$, $R_2N$-radical; Y represents an $R_3O$—, $R_3S$—

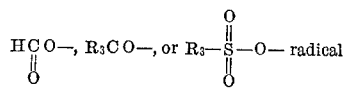

with the proviso that $R_1$, $R_2$ and $R_3$ each may be the same or different and represents an alkyl, aryl or aralkyl radical or an alkyl, aryl or aralkyl radical having functional groups composed of chlorine, nitrogen, oxygen and sulfur, and further X and Y mutually may form a ring.

That is, the polymerization catalyst represented by the general formula

includes such well known compounds as alkyl-, aryl- or aralkyl-sulfonic acid anhydrides, the esters thereof, the anhydrides of alkyl-, aryl-, or aralkyl-sulfonic acid with organic carboxylic acid, dialkyl-, diaryl or diaralkyl-sulfuric acids, alkyl-, aryl-, or aralkyl-thiosulfuric acid esters, alkyl-, aryl-, or aralkyl-thiosulfonic acid esters, alkyl-, aryl-, or aralkyl-sulfamic acid esters, the anhydrides of alkyl-, aryl-, or aralkyl-sulfamic acid with organic carboxylic acid, etc.

As above-said compounds; benzene sulfonic acid anhydride, 1-naphthalene sulfonic acid anhydride, methyl-, ethyl-, isopropyl- or benzyl-ester of benzene sulfonic acid, methyl-, ethyl-, n-butyl- or 1-chloro ethyl-ester of toluene sulfonic acid, ethyl- or isopropyl ester of meta-nitro benzene sulfonic acid, methyl ester of p-nitro benzene sulfonic acid, ethyl- or isoamyl-ester of 2,4-dinitrobenzene sulfonic acid, methyl-, ethyl-, or benzyl-ester of p-chloro benzene sulfonic acid, ethyl sulfonic acid ethyl ester, sulfones, o-sulfobenzoic acid anhydride, sulfoacetic acid anhydride, dimethyl sulfuric acid, diethyl sulfuric acid, di-n-propylsulfuric acid, ethyl-thio sulfuric acid propyl ester, toluene thiosulfonic acid ethyl ester, diethyl amine-N-sulfonic acid ethyl ester, etc. are, for example, included.

(3) Salts of oxygen containing acids of sulfur having various oxidation degree. In other words, salts of sulfurous acid, sulfuric acid having organic radical such as alkyl-, aryl-, or aralkyl-radical, hydrosulfuric acid, pyrosulfuric acid, thiosulfuric acid, thiosulfuric acid having organic radical such as alkyl-, aryl-, or aralkyl-, or polythionic acid. Salts may be metal salts or organic salts. Metals of metal salts are those, belonging to I$a$, I$b$, II$a$, II$b$, III$a$, IV$a$, V$a$, VI$b$, VII$b$, and VIII$b$ groups of the periodical table. Organic salts include salts of organic amines especially of primary-, secondary-, tertiary-, or quaternary-amines of the aliphatic- or aromatic-series.

The polymerization catalyst belonging to this group includes metal salts of hydrosulfuric acid, metal salts or organic amine salts of pyrosulfuric acid, metal salts or organic amine salts of trithionic acid, metal salts or organic amine salts of alkyl-, aryl-, or aralkyl-sulfuric acid, and metal salts or organic amine salts of alkyl-, aryl-, or aralkyl-thiosulfuric acid.

As metal salts of hydrosulfuric acid, hydrosulfate of metal belonging to I$a$ group of the periodic table or double salts thereof such as ammonium hydrosulfate, lithium hydrosulfate, sodium hydrosulfate, potassium hydrosulfate, potassium sulfate, tripotassium hydrosulfate, hydrosulfate of metal belonging to II$a$ group of the periodic table such as magnesium hydrosulfate, hydrosulfate of metal belonging to III$a$ group of the periodic table such as aluminum tetrahydrosulfate, aluminum hexahydrosulfate, etc. can be illustrated.

As metal salts of pyrosulfuric acid, salts of pyrosulfuric acid with metals belonging to I$a$ group of the periodic table such as ammonium salt, lithium salt, sodium salt, and potassium salt of pyrosulfuric acid, salts with metals belonging to I$b$ group of the periodic table such as silver salt and copper salt of pyrosulfuric acid, salts with metals belonging to II$a$ group of the periodic table such as magnesium salt, calcium salt, and barium salt, salts with metals belonging to II$b$ group such as zinc salt, salts with metals belonging to III$a$ group such as aluminum salt, salts with metals belonging to IV$a$ group such as lead salt, further iron salt and uranium salt of pyrosulfuric acid can be illustrated.

As amine salts of pyrosulfuric acid, primary-, secondary-, tertiary-, and quaternary-amine of aliphatic or aromatic series such as pyridine salt, dimethyl aniline salt, n-butylamine salt, diethylamine salt, and trimethylphenyl ammonium salt of pyrosulfuric acid can be illustrated.

As trithionates, salts of trithionic acid with metals of I$a$ group of the periodic table such as ammonium trithionate, sodium trithionate and potassium trithionate, salts with metal of I$b$ group of the periodic table such as copper trithionate and silver trithionate, salts with metals of II$a$ group such as magnesium salt, strontium salt and barium salt, salts with metals of II$b$ group such as zinc salt and cadmium salt, salts with metals of III$a$ group such as aluminum salt, salts with metals of IV$a$ group such as tin salt and lead salt, salts with metals of V$a$ group such as bismuth salt, and antimony salt, and salts with iron, cobalt, and nickel can be illustrated.

As organic amine salts, primary-, secondary-, tertiary-, and quaternary-amine of aliphatic or aromatic series such as pyridine salt, dimethyl aniline salt, n-butyl amine salt, diethyl amine salt and trimethyl phenyl amine salt can be illustrated.

Heretofore, it has been known that alkyl sulfonic acid salts can be used as alkylating agent for hydroxy radical but it is entirely unknown that they can be used as the polymerization catalyst, not to speak of the function as the polymerization catalyst of trioxane. Further it is an entirely unknown fact that the above-mentioned compounds can be used as the catalyst of ring opening polymerization of trioxane.

It is known that sulfonic acids can be used as the catalyst for cationic polymerization of vinyl compounds such as styrene but it has never been applied to trioxane.

It has now been found that trioxane can be polymerized by use of the above-mentioned three kinds of catalysts to yield a tough, white polyoxymethylene having a melting point of 173°–184° C. which can be subjected to molding and extrusion to produce shaped articles having excellent properties.

The advantage of the above-mentioned catalysts used in the polymerization of trioxane can be illustrated as follows.

(1) They are catalysts whose handling is easy. Boron trifluoride or its complex is a violent reagent and handling of this kind of reagent involves many difficulties. In other words it shows violent interaction between oxygen, humidity and active hydrogen. When used in polymerization, it is necessary to pay extra attention for controlling polymerization on account of readiness of deterioration by reaction. On the other hand each of the catalyst groups used in the present invention is stable at room temperature, not corrosive and easy in handling. These are the great advantages when used in the actual production.

(2) They are catalysts which enable to control polymerization easily. Their polymerizing activity is mild and controllable. Since such a catalyst as boron trifluoride or sulfuric acid has violent activity, the control of polymerization is difficult. Whereas the catalysts of the present invention have mild activity and the removal of polymerization heat and the control of polymerization temperature are easy. For example by change of polymerization temperature or time or catalyst concentration extensively, it is possible to produce polyoxymethylene having any given values of polymerization degree and polymerization rate.

(3) They enable the production of polyoxymethylene having good stability. It is unknown that acidic compounds produce deleterious effects upon the stability of polyoxymethylene. Therefore, acidic compounds have been used as the polymerization catalyst of trioxane and residual catalysts remaining in the polymer reduce the heat and light stability thereof. Accordingly it has been necessary to wash the polymer sufficiently, but it has been extremely difficult to eliminate trace of strong acidic catalyst mixed in the polymer when the said acid is used as a catalyst. The polymer produced according to the present invention shows better stability than conventional polymers having the same polymerization degree. Though not exactly known, it is believed that the reason of better stability resides in the following facts. The catalysts of the present invention are of neutralized type, the catalysts are readily eliminated by washing, and especially the catalysts or organic ester type attach to the terminal group of polyoxymethylene chain, by which release from hydroxyl group is prevented. At any rate properties of polyoxymethylene obtained are remarkably improved.

The actual polymerization method of the present invention is not extraordinary, and ordinary procedure of polymerization can be used without great deal of alteration. However all the catalysts of the above-mentioned groups are not handled exactly the same way. Since each of the catalyst groups has its own different activity, shape and physical property, the handling must be altered accordingly. Though more fully disclosed below, sulfonates have, in general, greater catalytic activity than sulfuric acid ester. Especially m-nitrobenzene sulfonic acid ethyl ester has greater activity than p-toluene sulfonic acid methyl ester. The catalytic activity of the inorganic salts mentioned above varies according to the nature of the metals. Among the acid groups of the inorganic salts the activity of hydrosulfuric acid is the weakest.

The amount of the above-described polymerization catalysts may be used in the range from 0.0001 to 1% by weight based on trioxane, preferably, in the range from 0.001 to 0.5% by weight based on trioxane. The exact amount must be altered according to polymerization degree, polymerization rate and kind of catalyst. The determined amount of a catalyst may be added into a reactor in liquid phase or solid phase with vigorous agitation, however, it may be dispersed into a reactor as 0.1 to 50% by weight solution of a solvent such as benzene, toluene, ethers, dimethyl formamide, dimethyl sulfoxide, tetramethyl urea, or the like to allow uniform dispersion of a catalyst into trioxane.

The polymerization temperature may vary in the wide range from room temperature to 200° C., preferably from 50° C. to 110° C. According to one method the polymerization is carried out in the range from 70° C. to 100° C. in the molten state of trioxane, in the form of mass polymerization, while according to another method the polymerization is carried out in the range from 50° C. to 110° C. by using a reaction medium such as hydrocarbons, halogenated hydrocarbons, ethers, ketones, nitriles or esters which are inactive to the catalysts, especially by using about 20% to 90% by weight trioxane solution in an organic solvent such as benzene, toluene or cyclohexane. According to still another method the polymerization is carried out in a suspension of about 20% to 90% by weight trioxane in a nonsolvent which dissolves dioxane partially such as n-octane or n-heptane.

The charging order of trioxane, a polymerization catalyst, if desired, an organic solvent or a nonsolvent which dissolves trioxane partially into a reactor does not matter for attaining the objects of the present invention, however, it is preferable to add a polymerization catalyst into a reactor lastly and at this time the reactor may be at the determined polymerization temperature or may be raised to the polymerization temperature after the addition of a catalyst.

The polymerization time should be determined in relation to the kind of and the amount of catalyst and the polymerization temperature to obtain an excellent polyoxymethylene in good yields. The above-said catalyst convert trioxane into a polyoxymethylene within about 1 to 50 hours and when the most active catalysts to convert trioxane into a polyoxymethylene are used, the polymerization terminates substantially within 16 hours. The polymerization rate (percentage of polymerization in one cycle) must be determined in relation to the operation condition of recovering system. It is possible to carry out polymerization completely.

The polymerization may be carried out in open air, however, preferably in an inert gas such as nitrogen gas or in an organic solvent or in the vapor of a medium at super-atmospheric, autogenous or atmospheric pressure.

The trioxane used in the practice of the present invention has no special limitation, but it is preferable to be in anhydrous or substantially anhydrous state. Small amounts of moisture present in commercial trioxane or absorbed by the contact with air do not prevent the polymerization. However since the presence of moisture exerts some influence upon molecular weight and thermal stability, it is preferable to use commercial trioxane purified by recrystallization from benzene or toluene or by sublimation or by distillation.

In recovering a polyoxymethylene from the reaction products, the monomer and the solvent or medium, if it is existing, should be removed from the polymer. The polymer is then washed with an organic solvent or water and dried. If the solvent or medium is not existing in the polymer the polymer is washed one or several times with water, alcohol or preferably with an alcoholic solution containing alkali metal alkoxide or acetic acid salt of alkali metal. The polymer thus obtained is pure white powder, granule, flake, or block, and can be provided for molding after various kinds of stabilizing treatment.

The addition of such stabilizers can be effected during the course of polymerization. In other words it can be added to the polymerization system before starting of, or during the course of, or after finishing of polymerization, while yielding frequently remarkable result.

The polyoxymethylene produced according to the present invention is not only by no means inferior to that produced by conventional methods e.g. by use of antimony compound, boron fluoride or $\gamma$-ray, but also is much superior in the point of thermal stability. Furthermore the present invention is particularly significant in the commercial production since it provides a method which uses catalysts easily in handling and as a result of this advantage, it brings about the reduction of production cost.

This invention is illustrated further by the following examples which should not be understood as limitations thereof. Unless otherwise indicated parts are by weight and the inherent viscosities refer to viscosities of 1% solutions of the polymer at 60° C. in p-chloro-phenol containing 2% by weight of alpha-pinene.

Example 1

4 cc. of an ether solution of m-nitrobenzene sulfonic acid ethyl ester (the concentration being 0.2566 g./100 cc.) are charged into a glass tube and after evaporating the ether completely, 10 parts of trioxane purified by recrystallization from toluene are added thereto. Then the tube is sealed under vacuum, heated to 100° C. and immediately the polymerization takes place. In 3 hours the content turns into a white solid and the tube is opened after 5 hours and the resulting white solid is pulverized, washed sufficiently with hot ethanol, dried under vacuum at 40° C. overnight and are obtained 5.3 parts of the polymer having an inherent viscosity of 4.26 and the softening point is 182°–183.5° C. Then the polymer is moulded at 183° C. for 2 minutes to give a white translucent plate.

Example 2

In a glass tube 10 parts of trioxane purified by distillation and 0.0081 part of toluene sulfonic acid methyl ester are charged and the tube is sealed under vacuum and heated at 70° C. for 5 hours. After 5 hours the tube is opened and the resulting solid is pulverized, washed sufficiently with hot ethanol and dried under vacuum overnight and are obtained 1.03 parts of a polyoxymethylene having an inherent viscosity of 4.11. The softening point is 182°–183° C.

Example 3

In a glass tube 4 cc. of an ether solution of diethyl sulfuric acid (the concentration being 0.1712 g./100 cc.) are charged and after evaporating off ether completely, 10 parts of trioxane purified by distillation are added thereto. Then the tube is sealed under vacuum, heated to 100° C. and immediately the polymerization takes place. In 24 hours the reaction mixture is solidified and the resulting white polymer is pulverized, washed sufficiently with hot ethanol, dried under vacuum overnight and are obtained 6.8 parts of a polyoxymethylene having an inherent viscosity of 3.51. The softening point is 180°–181° C.

Example 4

In a glass tube 20 parts of trioxane purified by recrystallization from toluene and 0.0156 part of o-sulfobenzoic acid anhydride are charged and the tube is flashed with nitrogen gas and sealed, heated to 100° C. and immediately the polymerization takes place and the white solid begins to precipitate. In 24 hours the content is solidified and the resulting white polymer is pulverized, washed three times with hot water of 80° C. and dried under vacuum overnight and are obtained 12.3 parts of a polyoxymethlene having an inherent viscosity of 2.51. The softening point is 180°–181° C.

Example 5

In a 3-neck flask 100 parts of trioxane and 50 parts of toluene are charged and heated to 100° C. with stirring. 0.126 part of m-nitrobenzene sulfonic acid ethyl ester is added thereto. In 5 minutes a small amount of solid begins to precipitate. After stirring for 20 hours the reaction dope is filtered off, washed sufficiently with ether and next ethanol and dried at 40° C. overnight and are obtained 43.7 parts of a polyoxymethylene having an inherent viscosity of 1.12. The softening point is 179°–180° C.

Example 6

In a 3-neck flask 100 parts of trioxane and 50 parts of n-heptane are charged and stirred. 0.126 part of m-nitrobenzene sulfonic acid ethyl ester is added thereto and heated to the boiling state of n-heptane; that is, 98.4° C. to form a suspension of molten trioxane in n-heptane. The polymerization is kept to be in the boiling state of n-heptane for 20 hours, and the reaction product is filtered off, washed sufficiently with ether twice and ethanol, dried under vacuum at 40° C. overnight and are obtained 15.2 parts of a polyoxymethylene having an inherent viscosity of 0.82. The softening point is 178°–179° C.

Example 7

In a glass tube, 2.88 parts of ether solution of diethyl sulfurous acid (the concentration being 0.1534 g./100 cc.) are charged and after evaporating the ether completely, 10 parts of trioxane purified by recrystallization from toluene are added thereto. After flashing with dry nitrogen gas, the tube is sealed by fusion under vacuum. In 20 hours, the contents turn to a white solid. The content is pulverized, washed sufficiently with hot ethanol, dried under vacuum at 40° C. overnight, and obtained 7.9 parts of the polymer having an inherent viscosity of 0.91 and a softening point of 178°–179° C. This polymer is moulded at 179° C. for one minute to give a white translucent plate. When diethyl sulfurous acid is not used, it is impossible to obtain the polymer.

Example 8

In a glass tube, 10 parts of trioxane purified by distillation and then 2.5 parts of methyl cyclohexane and 0.0031 part of p-chlorobenzene sulfinic acid are charged. After being flashed with dry nitrogen, the tube is sealed under vacuum and heated at 85° C. In 16 hours, the content is solidified. It is taken out, pulverized, washed with hot ethanol, dried under vacuum at 40° C. overnight and obtained 8.1 parts of polyoxymethylene having an inherent viscosity of 0.95 and a softening point of 178°–180° C.

Example 9

In a glass tube, 2.88 parts of ether solution of m-nitrobenzene sulfinic acid ethyl ether (the concentration being 0.238 g./100 cc.) are charged and after evaporating the ether, 10 parts of trioxane, purified by sublimation are added thereto. After flashing with dry nitrogen, the tube is sealed under vacuum, and heated at 100° C. In 20 hours, the content is taken out, pulverized, washed sufficiently with hot ethanol, dried under vacuum at 40° C. overnight and obtained 6.1 parts of polyoxymethylene having an inherent viscosity of 0.21.

Example 10

In a glass tube, 10 parts of trioxane, 0.013 part of toluene sulfinic acid anhydride are charged and after being flashed with dry nitrogen, the tube is sealed under vacuum. When the tube is heated at 100° C. the polymerization starts (shows white turbidity) and in 20 hours the content of the tube is solidified, yielding 5.3 parts of polyoxymethylene having an inherent viscosity of 0.98.

Example 11

In a glass tube 10 parts of trioxane purified by atmospheric distillation in the presence of metallic sodium, 0.0184 part of anhydride of m-nitro benzene sulfonic acid and acetic acid and 2 parts of methyl cyclohexane are charged. Then the tube is flashed with nitrogen gas, sealed under vacuum, heated to 85° C. and immediately the polymerization takes place. In 16 hours the content is solidified and the resulting white polymer is treated in the same manner as in Example 1 and are obtained 5.1 parts of a polyoxymethylene having an inherent viscosity of 1.36. The softening point is 178°–180° C.

Example 12

Using the same procedure as in Example 1, 0.0102 part of benzene-thiosulfonic acid n-butyl ester is employed instead of m-nitrobenzene sulfonic acid ethyl ester in Example 1 and are obtained 2.4 parts of a polyoxymethylene having inherent viscosity of 0.89. The softening point is 178°–180° C.

Example 13

Using the same procedure as in Example 1, 0.027 part of benzene sulfonic acid anhydride is employed instead of m-nitrobenzene sulfonic acid ethyl ester in Example 1 and are obtained 4.7 parts of a polyoxymethylene having an inherent viscosity of 1.71. The softening point is 178°–180° C.

Example 14

Using the same procedure as in Example 1, 0.0153 part of diethylamine-N-sulfonic acid ethyl ester and are obtained 2.6 parts of a polyoxymethylene having an inherent viscosity of 0.91. The softening point is 178°–179° C.

Example 15

In a glass tube, 0.013 part of potassium bisulfate, and 10 parts of trioxane purified by recrystallization are charged. After being flashed with nitrogen, the tube is sealed under vacuum and heated at 100° C. In 3 hours, white solid matter begins to precipitate. In 40 hours, the tube is opened, the solid matter is taken out, pulverized, washed with 0.1 N sodium ethoxide ethanol solution sufficiently, then with hot ethanol sufficiently and dried at 40° C. overnight, whereby 4.45 parts of polymer having an inherent viscosity of 0.88 and a softening point of 178°–179° C. are obtained.

Example 16

In a glass tube, 0.018 part of sodium lauryl sulfate, 10 parts of trioxane purified by recrystallization and 2.5 parts of methyl cyclohexane are charged. After being flashed with nitrogen, the tube is sealed under vacuum. When the tube is heated at 75° C., the content of the tube solidifies to white matter. After 20 hours, the tube is opened, the solid matter is pulverized, washed with ether, then with hot 0.1 N sodium ethoxide ethanol solution sufficiently and finally with ethanol sufficiently, dried at 40° C. overnight and obtained 7.05 parts of white fluffy polyoxymethylene having an inherent viscosity of 1.61 and a softening point of 179°–180° C. This polymer is pressed at 175° C. for one minute to give a thin plate having good tenacity.

Example 17

In a glass tube 0.0245 part of sodium pyrosulfate and 10 parts of trioxane purified by distillation in the presence of sodium. After being flashed with dry nitrogen the tube is sealed under vacuum. When the tube is heated at 100° C., the polymerization immediately starts and in 30 minutes the content is solidified. In 4 hours, by treating as in Example 15, 7.3 parts of polyoxymethylene having a viscosity of 1.02 is obtained.

Example 18

In a glass tube, 0.0262 part of potassium trithionate

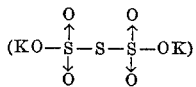

and 10 parts of trioxane purified by sublimation are charged and subjected to polymerization as in Example 15 by which 5.4 parts of polyoxymethylene having an inherent viscosity of 0.98 are obtained.

Example 19

Using 0.0146 part of sodium ethyl thiosulfate, instead of sodium lauryl sulfate, the polymerization and after treatment are conducted as in Example 16 by which 6.1 parts of polyoxymethylene having a softening point of 178°–179° C. are obtained.

What is claimed is:

1. A method of producing a polyoxymethylene which comprises polymerizing trioxane at a temperature of from room temperature to 200° C. in the presence of 0.0001–1% by weight, based on the weight of the trioxane, of at least one polymerization catalyst selected from the group consisting of the following compounds:

(a) compounds of the formula:

wherein X represents $R_1$ or $R_2O$—, Y represents —$OR_3$ or

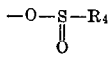

when X represents $R_1$ and Y represents —$OR_5$ or halogen when X represents $R_2O$—, said R groups being defined below and provided that $R_1$, $R_2$, $R_3$ and $R_5$ each may be the same or different, and are selected from the group consisting of alkyl groups having one to four carbon atoms, an aryl group having six carbon atoms, an aralkyl group having seven carbon atoms, or the above-mentioned alkyl, aryl, or aralkyl group being substituted with functional groups including atoms selected from the group consisting of chlorine, nitrogen, oxygen, sulfur, carbon, and hydrogen, $R_4$ is an aryl group having six carbon atoms, $R_1$ and $R_4$ are equivalent when Y is

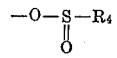

and the aryl and aryl substituted groups are excluded from $R_2$ when Y is a halogen;

(b) compounds of the formula:

wherein X represents $R_1$, $R_1O$—, or $R_1R_2N$—; Y represents $R_3O$— or $R_3S$—, $R_1$, $R_2$ and $R_3$ each being the same or different and representing alkyl groups having one to three carbon atoms, an aryl group having six or ten carbon atoms, an aralkyl group having seven carbon atoms or the above-mentioned groups being substituted with functional groups including atoms selected from the group consisting of chlorine, nitrogen, oxygen, carbon and hydrogen, and when X is $R_1$, Y is $R_3O$ and $R_1$ and $R_3$ are alkyl, X and Y form a ring with the S atom;

(c) metal salts of sulfurous acid, sulfuric acid having an organic radical selected from the group consisting of alkyl, aryl and aralkyl, hydrosulfuric acid, pyrosulfuric acid, thiosulfuric acid having an organic radical selected from the group consisting of alkyl, aryl and aralkyl, and polythionic acid, the metal of said metal salts being selected from the group consisting of Groups Ia, Ib, IIa, IIb, IIIa, IVa, Va, VIb, VIIb and VIIIb of the Periodic Table; and (d) organic amine salts of sulfurous acid, sulfuric acid having an organic radical selected from the group consisting of alkyl, aryl, or aralkyl, hydrosulfuric acid, pyrosulfuric acid, thiosulfuric acid having an organic radical selected from the group consisting of alkyl, aryl or aralkyl radical and polythionic acid.

2. The method as claimed in claim 1 wherein the temperature is 50° C. to 110° C.

3. The method as claimed in claim 1 wherein the catalyst is present in an amount of 0.001–0.5% by weight.

4. The method as claimed in claim 1 wherein polymerizing is effected for 1 to 50 hours.

5. The method as claimed in claim 1 wherein polymerizing is effected for 1 to 16 hours.

6. The method as claimed in claim 1 wherein the catalyst is m-nitrobenzene sulfonic acid ethyl ester.

7. The method as claimed in claim 1 wherein the catalyst is diethylsulfurous acid.

8. The method as claimed in claim 1 wherein the catalyst is sodium lauryl sulfate.

9. The method as claimed in claim 1 wherein the catalyst is dipotassium pyrosulfate.

10. The method as claimed in claim 1 wherein the catalyst is the anhydride of m-nitrobenzene sulfonic acid.

11. The method as claimed in claim 1 wherein the catalyst is the anhydride of m-nitrobenzene sulfonic acid and acetic acid.

References Cited

UNITED STATES PATENTS 2,848,437   8/1958   Langsdorf et al.
3,316,217   4/1967   Weissermel et al.
3,297,642   1/1967   Richzenhain et al. ____ 260—67

WILLIAM H. SHORT, *Primary Examiner.*

L. M. PHYNES, *Assistant Examiner.*